United States Patent

Bauer

[15] 3,645,442

[45] Feb. 29, 1972

[54] FLUIDIC COUNTER

[72] Inventor: Peter Bauer, Germantown, Md.

[73] Assignee: Bowles Engineering Corporation, Silver Spring, Md.

[22] Filed: Sept. 16, 1969

[21] Appl. No.: 858,322

[52] U.S. Cl. .......... 235/201
[51] Int. Cl. .......... G06d 1/08
[58] Field of Search .......... 235/200, 201

[56] References Cited

UNITED STATES PATENTS

| | | | |
|---|---|---|---|
| 3,227,368 | 1/1966 | Jacoby | 235/201 |
| 3,237,858 | 3/1966 | Schoppe et al. | 235/201 |
| 3,243,113 | 3/1966 | Welsh | 235/201 |
| 3,305,170 | 2/1967 | Zilberfarb | 235/201 |
| 3,331,381 | 7/1967 | Quigley | 137/81.5 |
| 3,339,569 | 9/1967 | Bauer et al. | 235/201 X |
| 3,342,197 | 9/1967 | Phillips | 235/201 X |
| 3,433,408 | 3/1969 | Bellman et al. | 201/201 |
| 3,473,546 | 10/1969 | Bellman | 235/201 X |

*Primary Examiner*—Richard B. Wilkinson
*Assistant Examiner*—Lawrence R. Franklin
*Attorney*—Rose & Edell

[57] ABSTRACT

A fluidic binary counter stage requires only two fluidic elements; a flip-flop and an OR/NOR gate. Input pressure pulses set the flip-flop, the reset output from which remains applied to the OR/NOR gate until the input pulse terminates. Pulsed pressure interruptions are applied to the or/NOR gate, the NOR and OR signals from which are delivered to the next counter stage as input pressure and inverted pressure pulses respectively. The counter can count in any base number system by connecting a reset signal to each flip-flop from an appropriate subsequent stage.

17 Claims, 19 Drawing Figures

Patented Feb. 29, 1972

3,645,442

3 Sheets-Sheet 1

INVENTOR
PETER BAUER

Hurvitz & Rose

ATTORNEYS

INVENTOR
PETER BAUER

Hurvitz + Rose

ATTORNEYS

Patented Feb. 29, 1972

3,645,442

3 Sheets-Sheet 3

INVENTOR
PETER BAUER

Hurvitz & Rose

ATTORNEYS

FLUIDIC COUNTER

BACKGROUND OF THE INVENTION

The present invention relates to fluidic counters and more particularly to such counters employing only two fluidic elements per stage and yet having reliable switching characteristics in response to input pulses.

Fluidic counter stages or pulse converters as they are sometimes referred to are well known in the prior art. An early such converter is disclosed in U.S. Pat. No. 3,001,698 to R. W. Warren and comprises a fluidic amplifier having opposed control nozzles interconnected through a flow system such that a pressure differential is created across the ends of the flow system when the power jet of the amplifier more closely approaches one nozzle than the other. This pressure differential establishes a flow in the flow system and is used to steer sequential count pulses introduced into the flow system to said one control nozzle so that the power stream flowing between the nozzles is deflected by a count pulse toward the other control nozzle. The power stream is therefore alternately switched in response to successive count pulses. The problem with this converter is that it lacks the degree of reliability required in certain control or guidance systems. Specifically, the steering flow between control nozzles has been found to occasionally generate eddys adjacent the point of intersection of the input pulse. The eddys tend to direct an incoming count pulse toward the wrong control nozzle; that is, toward the control nozzle remote from the power stream. Various attempts to eliminate this problem have been made. One such attempt was to liberally vent the flow system in the region of critical interaction between the incoming count pulses and the steering flow between the control nozzles. Such venting has resulted in an improvement of reliability of the converter, but not a sufficient improvement to permit use in guidance and other long term high reliability systems.

Another attempt to solve the problem of reliability in a fluidic pulse converter is found in U.S. Pat. No. 3,223,101 to R. E. Bowles. The approach employed in the Bowles patent is to utilize the output signals of a first binary type fluid amplifier to energize the control nozzles of a second fluid amplifier which has its power nozzle adapted to receive fluid count pulses. The control nozzles of the second amplifier bias the count pulses to the appropriate one of the output passages which are connected back to the first amplifier as respective control inputs. This feedback arrangement, while it does provide greater reliability than the Warren converter, requires a crossover of the respective feedback passages, is awkward to manufacture, and introduces undesirable space limitations. More specifically, the Bowles converter cannot be constructed with all of the fluid passages existing in a common plane, but rather requires a three dimensional approach to construction.

Still another approach is found in U.S. Pat. No. 3,226,023 to B. M. Horton, and U.S. Pat. No. 3,232,305 to E. Groeber. Both Groeber and Horton employ a bistable fluid amplifier to provide the converter output signals, portions of which are fed back to respective ones of a pair of fluid logic gates. The logic gates are biased by the fed back portion of the output signals to direct the input count pulses to the appropriate one of the control passages of the bistable fluid amplifier. This type of converter does, in fact, operate with high reliability; however, the improved reliability is achieved through sacrifices in economy and sensitivity. Specifically as to sensitivity, the fed back signal is vented at the logic gate in the absence of an input count pulse. The vented flow tends to aspirate fluid from the passage which serves to conduct fluid from the logic gate to the control passage of the bistable amplifier. Aspiration tends to reduce the pressure in such passage. The power stream of the bistable amplifier also tends to aspirate fluid from the control nozzle at the other end of the same passage. The double aspiration action provides a substantially reduced pressure in the passage, which reduced pressure must be overcome by an incoming count pulse in order to reflect the power stream in the bistable amplifier, introducing a time delay into the system or requiring a very steep wave front to maintain switching times. Also the pressure level required of the count pulse is greater than would be required if the passage in question were maintained at ambient pressure. Further, and this consideration also relates to economy, the input count pulses are divided between two logic gates, therefore requiring twice the count pulse flow than is actually necessary to effect switching and requiring three active fluidic elements for a single counter stage.

It is therefore an object of the present invention to provide a fluidic pulse converter requiring only two active fluidic elements and having reliable switching characteristics.

It is another object of the present invention to provide a fluidic counter stage requiring only two fluidic elements and capable of employment in fluidic counters of any base number.

It is still another object of the present invention to provide a novel fluidic biquinary counter.

SUMMARY OF THE INVENTION

The counter stage provided in accordance with the present invention comprises a set-reset fluidic flip-flop and fluidic OR/NOR gate. More specifically, the reset output signal from the flip-flop is applied to the OR/NOR gate through a delay element. Input count pulses, in the form of pressure pulses of a specified maximum width, are applied to the set input of the flip-flop. Input pulsed interruptions of a pressure signal, in time-coincidence with the pressure count pulses, are applied to the OR/NOR gate. The delay element maintains the reset signal from the flip-flop at the OR/NOR gate until the count pulse terminates, assuring that the OR/NOR gate responds to the count pulse in accordance with the precount pulse state of the flip-flop.

The above-described counter state is employed in a base-three counter by utilizing a second counter stage connected to receive the NOR output signal from the first stage as a count pressure pulse and the OR output signal from the first stage as a pulsed pressure-interruption signal. The NOR output signal from the second stage is then used to reset the flip-flops of both stages.

A novel fluidic biquinary counter employs five of the above-described counter stages connected in a chain. The NOR signal from the fourth stage is employed to reset the flip-flops of each of stages one through four, and the counter is made self-cycling by connecting the NOR signal from the fifth stage to reset the fifth stage flip-flop. A selectively actuable decoder, comprising a two-tiered ganged rotary switch and an AND gate, is employed to provide an output signal from the counter whenever the count coincides with the switch setting. If the decoder output signal is employed to reset all counter flip-flops, the counter operates in a preset mode, providing an output pulse every time the counter registers the number of counts selected by the switch setting.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein:

FIG. 2 is a schematic diagram of a base three counter stage employing two interconnected counter stages of the type illustrated in FIG. 1;

FIGS 2A through 2L are timing diagrams, graphically illustrating the sequence of various signals illustrated in FIG. 2;

DESCRIPTION OF THE PREFERRED EMBODIMENTS

Figure 1:
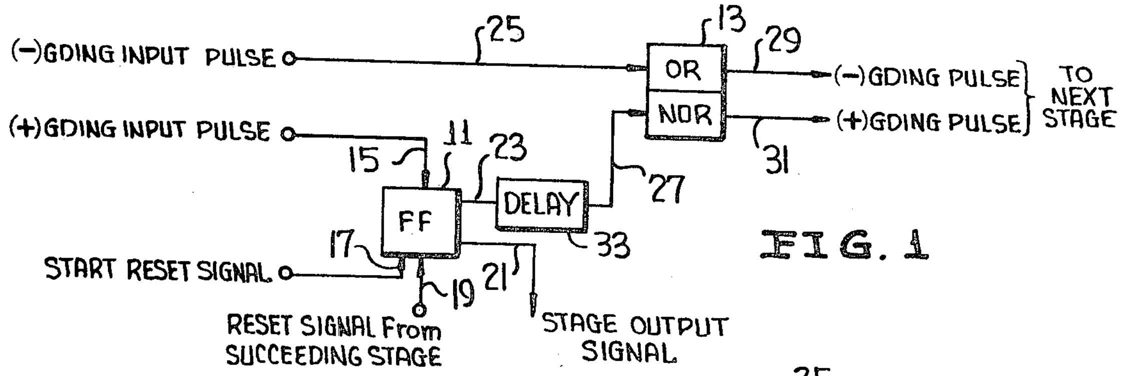
FIG. 1 is a schematic diagram of the fluidic counter stage of the present invention.

Referring to FIG. 1 of the accompanying drawings, the counter stage or pulse converter of the present invention comprises a fluidic flip-flop 11 and a fluidic OR/NOR-gate 13. Flip-flop 11 may be of the type described in U.S. Pat. No. 3,396,619; OR/NOR-gate 13 may be of the type described in U.S. Pat. No. 3,240,063. Flip-flop 11 has a set input port connected to an input passage 15, a reset input port connected to a pair of input passages 17, 19, a set output passage 21 and a reset output passage 23. In a well-known manner, flip-flop 11 has two stable states, providing a fluid signal at set output passage 21 in one stable state and a fluid signal at reset output passage 23 in the other stable state. The set state is assumed in response to a signal from input passage 15; the reset state is assumed in response to a signal from either of input passages 17 or 19.

OR/NOR-gate 13 has two input passages 25, 27, an OR-output passage 29 and a NOR-output passage 31. In a well-known manner, a fluid input signal at either or both input passages 25 and 27 provides a fluid output signal at OR-passage 29. If neither of passages 25 and 27 carry an input signal a fluid signal is applied to NOR-output passage 31.

Input signals to the circuit are applied to input passage 15 of flip-flop 11 and input passage 25 of OR/NOR-gate 13. More specifically, the signal applied to input passage 15 is normally a zero pressure signal which rises with each count pulse to a positive pressure sufficient to switch flip-flop 11 to its set state. The signal applied to input passage 25 is the binary complement of that applied to input passage 15; more particularly, input passage 25 normally has a positive pressure therein sufficient to maintain gate 13 in its OR mode and falls to a sufficiently low pressure with each count pulse to permit gate 13 to assume its NOR mode if no signal is applied to passage 27. The pressure count pulse on passage 15 and the pulsed pressure interruption on passage 25 are time-coincident and have a preestablished maximum pulse width.

Output passage 23 of flip-flop 11 is connected to the input side of a fluid signal delay element 33, the output side of which is connected to input passage 27 of gate 13. The signal delay through element 33 is slightly greater than the maximum width of the count pulses applied to input passage 15. This assures that each pulsed pressure interruption applied to gate 13 actuates the gate or not in accordance with the state of flip-flop 11 before occurrence of the count pulse in passage 15 accompanying that pulsed pressure interruption.

Input passage 17 receives a START RESET signal applied to all flip-flops in a counter at turn-on or as otherwise desired to assure that the flip-flops are in their desired (in this case, reset) states. Of course, if a counter is to contain some preset number at the start of each counting cycle, the START RESET signal would be applied at the set input side of certain flip-flops in the counting chain.

Input passage 19 receives a RESET signal from some succeeding stage in the counter in accordance with the counting mode logic employed. Generally, though not necessarily, such signal is derived from the NOR output passage 31 of the succeeding stage. If, however, the NOR signal from its own stage is employed for reset purposes, the counter stage of FIG. 1 acts as a pulse converter, alternating between the set and reset states of flip-flop 11 with application of successive count pulses.

OR and NOR output passages 29 and 31 are connected to the next counter stage in the circuit. More specifically, NOR-output passage 31 provides the pressure or count pulse for the flip-flop of the next stage; OR-output passage 29 provides the pulsed pressure interruption for the OR/NOR gate of the next stage.

In operation, the counter stage is initially placed in its reset state by the START RESET signal on input passage 17. After suitable delay through element 33, the reset signal is applied to input passage 27 of gate 13 and, along with the pressure signal on input passage 25, maintains said gate in its OR mode. The state of the counter circuit at this time is binary zero (in accordance with the binary convention assumed herein) since no signal is provided at output passage 21 of flip-flop 11.

A count pulse applied to input passage 15 switches flip-flop 11 to its set state, providing a binary output signal at output passage 21 and removing the reset signal from passage 23. The accompanying pulsed pressure interruption applied to input passage 25 does not affect the state of gate 13 because delay element 33 maintains the flip-flop reset signal applied to passage 27 until the count pulse (and pulsed pressure interruption) terminates. The effect of the first count pulse has thus been to switch flip-flop 11 to its set state and remove the reset signal from gate 13; gate 13 has not been switched from its OR mode.

The next count pulse on input passage 15 has no effect at flip-flop 11 since the latter is already in its set state. The accompanying pulsed pressure interruption on passage 25 removes the only current pressure signal from gate 13, and thereby switches the latter to its NOR mode. The OR signal is thus removed from OR passage 29 and the NOR signal is applied to NOR-passage 31. When the pressure interruption terminates, gate 13 returns to its OR mode. The effect of the second count pulse is thus to pass a count pulse to the next stage. The circuit of FIG. 1 continues to so pass count pulses to the next and subsequent counter stages in response to succeeding input count pulses until such time as flip-flop 11 is reset, as by the RESET signal at input passage 19. This, as described in more detail below, occurs when a predetermined subsequent counter stage is switched.

Figures 2, 2A:
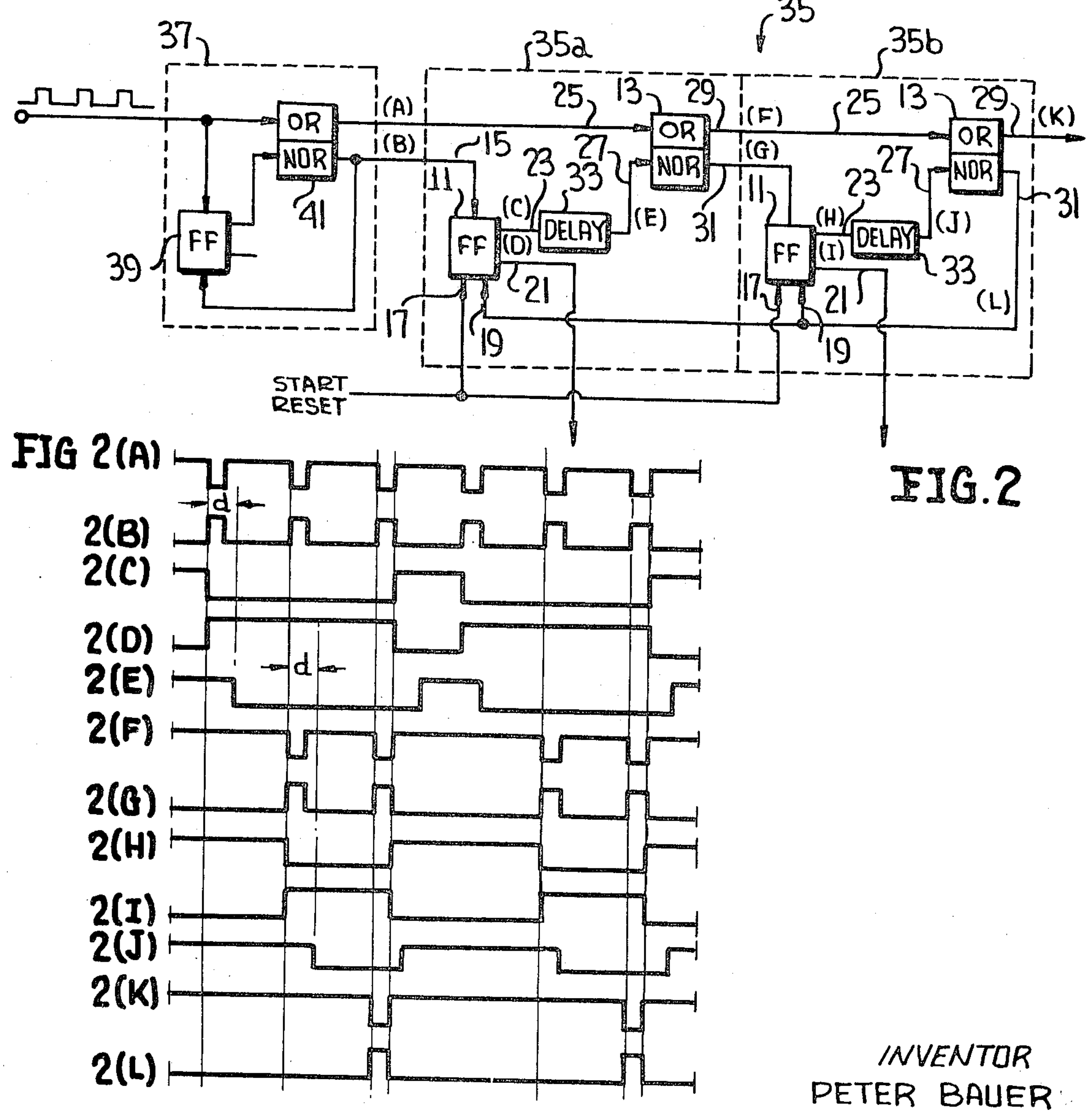

Referring now to FIG. 2 of the accompanying drawings, there is illustrated a base-three counter stage 35 employing two counter stages **35*a* and 35*b*** of the type illustrated in FIG. 1. Like elements in the stages of FIGS. 1 and 2 are designated by the same reference numerals.

The input signals (count pulse and pulsed pressure interruption) for stage **35*a* are provided by a fluidic pulse shaper 37 of the type described in copending U.S. Pat. application Ser. No. 771,758, filed Oct. 30, 1968 by P. Bauer and W. Mentzer and entitled "Fluidic Slip Resolver System." Other pulse shapers will serve the function, it being necessary that the shaper provide the requisite time-coincident pressure pulse and pulsed pressure interruption in response to each input pulse applied to the shaper. Briefly, shaper 37 operates as follows: input pulses are applied to a flip-flop 39 to place the latter in its set state; an OR/NOR-gate 41 is maintained in its OR mode before the shaper receives an input signal by the reset signal from flip-flop 39, and is kept in the OR mode after the flip-flop switches by the input pulse applied to the shaper. When the input pulse terminates, gate 41 switches to its NOR mode during which time it provides a pressure interruption at its OR passage and a pressure signal at its NOR passage. The NOR pressure signal is fed back to reset flip-flop 39 which in turn applies a reset signal to gate 41 to return the latter to its OR mode. Shaper 37 is thus a trailing edge shaper; that is, it provides a NOR pressure pulse to input passage 15 of stage 35*a* and an OR pulsed pressure interruption to input passage 25 of stage 35*b*, which are initiated upon termination of an input pulse applied to the shaper. The width of the NOR pressure pulse and the OR pulsed pressure interruption is fixed in accordance with the time required to feed the NOR signal back to reset flip-flop 39 and then switch gate 41** with the flip-flop reset output signal.

The interconnections between stages **35*a* and 35*b* are as follows: OR-output passage 29 of stage 35*a* is connected to input passage 25 of stage 35*b*; NOR-output passage 31 of stage 35*a* is connected to input passage 15 of stage 35*b*; and NOR-output passage 31 of stage 35*b* is connected as a reset line to input passages 19 of both stages 35*a*, 35*b***.

The operation of base-three counter stage 35 is best understood with reference to the timing diagrams of FIGS. 2A through 2L. Signals designated A through L in FIG. 2 correspond to signals graphically represented in FIGS. 2A through 2L respectively. More specifically, the following table indicates the signal (A–L) and the passage in which it appears:

TABLE

| Signal | Passage |
|---|---|
| A | 25, stage 35*a* |
| B | 15, stage 35*a* |
| C | 23, stage 35*a* |
| D | 21, stage 35*a* |
| E | 27, stage 35*a* |
| F | 25, stage 35*b* |
| G | 15, stage 35*b* |
| H | 23, stage 35*b* |
| I | 21, stage 35*b* |
| J | 27, stage 35*b* |
| K | 29, stage 35*b* |
| L | 31, stage 35*b*. |

In operation, flip-flops 11 are initially switched to their reset states by the START RESET signal. The first pulse applied to shaper 37 provides pulsed pressure interruption in signal A and a pressure pulse in signal B. The latter switches flip-flop 11 in stage 35*a* to its set state. The former has no effect on the state of gate 13 in stage 35*a* because signal E, a delayed version of signal C, does not fall to zero pressure until the pulsed interruption in signal A terminates; consequently at least one of the two signals A and E maintains a pressure signal at gate 13 in stage 35*a* to keep it in its OR mode. Because of this, signal F experiences no pulsed pressure interruption and signal G experiences no pressure pulse; therefore there are no input pulses applied to stage 35*b* as a result of the first count pulse received by shaper 37. Some time *d* after the onset of the pulse in signal A (*d* being greater than the width of that pulse) the pressure of signal E goes to zero so that the pressure in signal A is the only signal keeping gate 13 of stage 35*a* in its OR mode.

The next count pulse applied to shaper 37 produces another pressure pulse in signal B and pulsed pressure interruption in signal A. The pressure pulse in signal B has no effect at the flip-flop in stage 35*a* because the latter is already in its set state. The second pulsed interruption of signal A switches gate 13 in stage 35*a* to its NOR mode, interrupting the pressure in signal F and applying pressure in signal G. The pressure in signal G switches flip-flop 11 in stage 35*b* to its set state. The pressure interruption in signal F is shorter than the delay period *d* through element 33 so that signal J maintains reset signal pressure at gate 13 in stage 35*b* until after the pressure in signal F is restored. This of course occurs when the pressure returns to signal A to switch gate 13 in stage 35*a* to its OR mode. Thus the second count pulse changes the state of flip-flop 11 in stage 35*b* but does not affect the state of gate 13 in that stage.

The third count pulse cannot set flip-flop 11 in stage 35*a* for the latter is already set. The accompanying pulsed interruption in signal A places gate 13 of stage 35*a* in its NOR mode, interrupting the pressure in signal F and increasing the pressure in signal G. Flip-flop 11 in stage 35*b* is also unaffected because it also is in its set state. The pressure interruption in signal F now switches gate 13 in stage 35*b* to its NOR mode, thereby providing a reset signal from NOR-passage 31 in stage 35*b* to input passages 19 in each of stages 35*a* and 35*b*. Both flip-flops 11 are reset thereby and are ready to repeat the three-pulse cycle upon occurrence of the next count pulse.

The above-described three pulse cycle is observed to produce three distinct combinations of states in stages 35*a* and 35*b* in accordance with the number of pulses received. Specifically, after one pulse, stage 35*a* is binary one and stage 35*b* is binary zero. After two pulses both stages are binary one. After three pulses both stages are binary zero. Signals K and L may be applied to a subsequent base-three stage, identical to stage 35, to form a multistage base-three counter.

Figure 3:
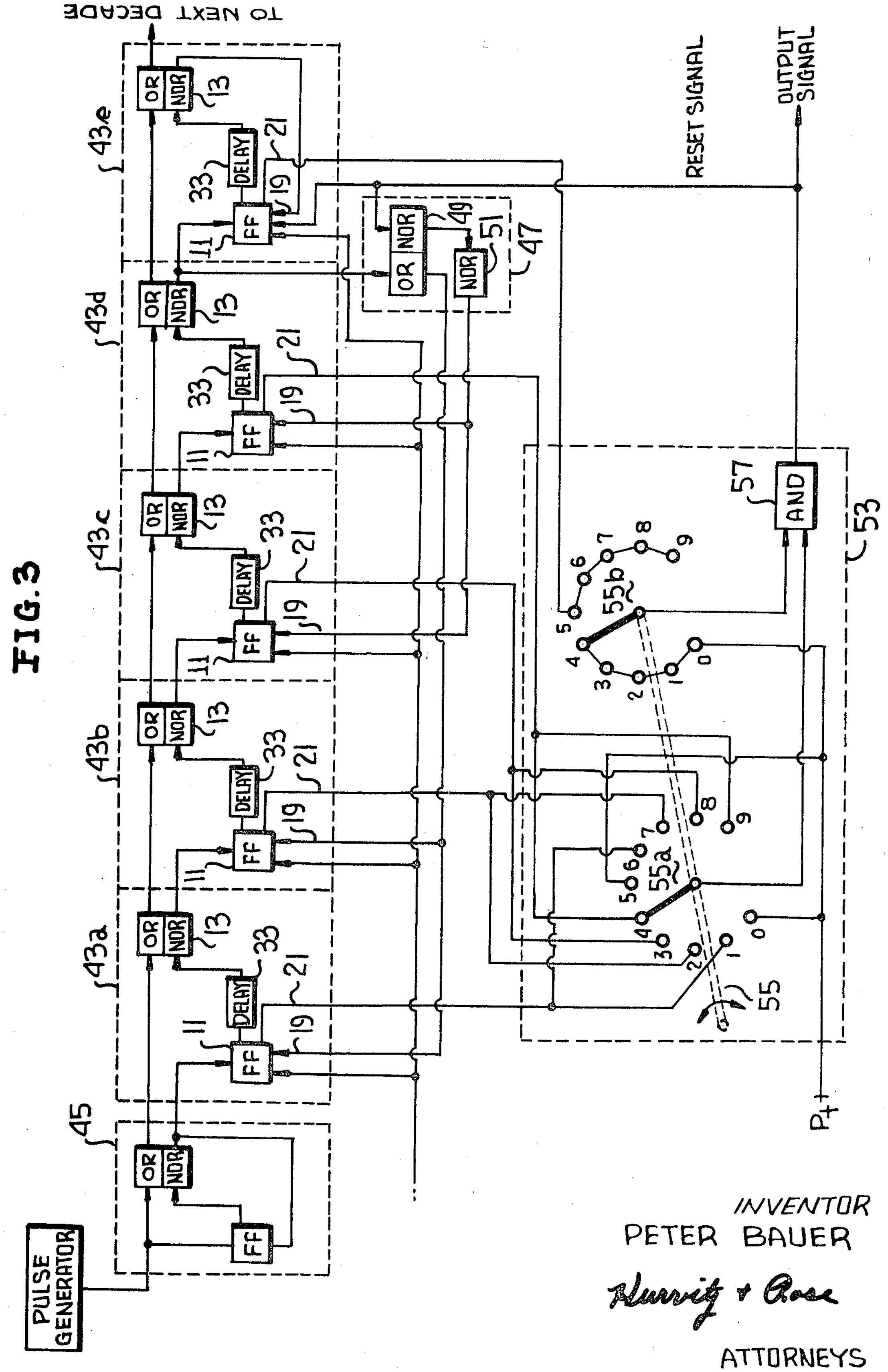
FIG. 3 is a schematic diagram of a single decade fluidic binary counter according to the principles of the present invention.

Referring now to FIG. 3, a biquinary fluidic counter 43 is illustrated comprising five identical stages 43*a*, 43*b*, 43*c*, 43*d*, and 43*e* of the type illustrated in FIG. 1. The stages are interconnected as described above with the OR signal from each of stages 43*a* through 43*d* applied to gate 13 of stages 43*b* through 43*e* respectively, and the NOR signal of stages 43*a* through 43*d* applied to the set input port of flip-flop 11 in stages 43*b* through 43*e* respectively. Count pulses are applied to trailing edge shaper 45, identical to shaper 37, which applies resulting pulsed pressure interruptions to gate 13 in stage 43*a* and applies pressure pulses to the set input port of flip-flop 11 in state 43*a*.

The NOR output signal from gate 13 of stage 43*d* is applied to a reset amplifier 47 comprising a pair of fluidic OR/NOR-gates 49, 51, the latter being connected to provide only a NOR output signal. More specifically, the NOR signal from stage 43*d* is an input signal to gate 49, and the NOR signal from gate 49 is an input signal for gate 51. The OR signal from gate 49 is applied as a reset signal to reset input passages 19 of stages 43*a* and 43*b*. The NOR output signal from gate 51 is applied as a reset signal to reset input passages 19 of stages 43*c* and 43*d*. The NOR output signal from gate 51 and the OR output signal from gate 49 are both present only when the NOR output signal from stage 43*d* is present. Reset amplifier 47 thus merely serves to amplify the reset signal from stage 43*d* to assure flip-flop switching.

The NOR output signal from stage 43*e* is applied to reset input passage 19 of that stage.

The operation of the circuit of FIG. 3 as thus far described should be apparent from the previous description of the circuits in FIGS. 1 and 2. Briefly, the first count pulse switches stage 43*a* to its set or binary one state. The second count pulse does not affect stage 43*a* but sets stage 43*b*. Likewise the third count pulse has no effect at stages 43*a* and 43*b* but sets stage 43*c*; and the fourth count pulse only sets stage 43*d*. Thus, after the first four count pulses, the first four stages are all in their set state. The fifth count pulse produces a NOR output pulse from stage 43*d* which is applied to stage 43*e* to place the latter in its set state. This NOR pulse is also applied to reset amplifier 47 which in turn resets stages 43*a* through 43*d*. Thus, after five count pulses the first four stages are reset at binary zero and the fifth stage is binary one.

The effects of the sixth through tenth count pulses are identical to the effects of the first through fifth count pulses, respectively, with the additional feature that the tenth count pulse effects a NOR output pulse from stage 43*e* which resets that stage so that after ten count pulses all five stages are reset to binary zero and are ready to begin another cycle of decade counting.

Also comprising part of the circuit of FIG. 3 is a decoder unit 53 which includes a rotary fluid switch 55 and a fluidic AND-gate 57. Switch 55 comprises two tiers or sections 55*a* and 55*b*, each having ten discrete peripheral contact positions numbered 0–9 inclusive respectively. The sections are ganged so that the switch arms are at the same positions in both sections at all times. The switch operates in a well-known manner to conduct fluid signals applied to the various peripheral contacts through the switch arm where the latter is in the appropriate position. AND-gate 57 is a conventional passive fluidic AND gate, for example of the type illustrated and described in U.S. Pat. No. 3,272,214.

Output passage 21 from stage 43*a* is connected to peripheral contacts 1 and 6 of switch section 55*a*. Likewise, output passage 21 in stages 43*b*, 43*c*, and 43*d* are connected to contacts 2 and 7, 3 and 8, and 4 and 9 respectively in switch section 55*a*. Output passage 21 of stage 43*e* is connected to contacts 5, 6, 7, 8 and 9 of switch section 55*b*. A constant pressure fluid signal is applied to contacts 0 and 5 of switch section 55*a* and to contacts 5, 6, 7, 8 and 9 of switch section 55*b*. AND-gate 57 functions as a two-input AND gate, receiving both input signals from the arms of switch sections 55*a* and 55*b*.

The output signal from AND-gate 57 serves as the output signal from decoder 43 and also serves as a reset signal for counter 43. In the latter capacity the signal is applied to the reset port in flip-flop 11 of stage 43*e* and as an input signal to OR/NOR-gate 49 in reset amplifier 47.

The operation of biquinary counter 43 with decoder 53 provides a selectively variable preset counter circuit. More particularly, counter 43 is automatically recycled after each *n* pulses where *n* is the setting of selector switch 55. For example, assume switch 55 to be in position 4 as illustrated. For the first three counts in any cycle there is no signal applied to contact 4 of switch section 55*a* because stage 43*d* remains in its reset state. Consequently, only the constant pressure (P+) signal applied to contact 4 of switch section 55*b* is applied as an input signal to AND-gate 57. At the fourth count pulse in the cycle stage 43*d* switches and applies a signal to contact 4 in switch section 55*a*. This actuates AND-gate 57 to provide an output signal and also resets all of the counter stages. After four more pulses are counted the same sequence ensues.

As a further example of the operation of the circuit of FIG. 3, assume that switch 55 is in position 7. In this position it is noted that switch section 55*a* applies an input signal to AND-gate 57 when counter 43 is registering counts of two, three, four, and seven. However, during counts two, three and four, stage 43*e* is still reset and no signal is applied to contact 7 of section 55*b;* consequently no input signal is applied to AND-gate 57 from switch section 55*b*. At count seven however both switch sections apply signals to their contact 7 and AND-gate 57 is actuated to provide an output signal and reset the counter.

Figure 4:
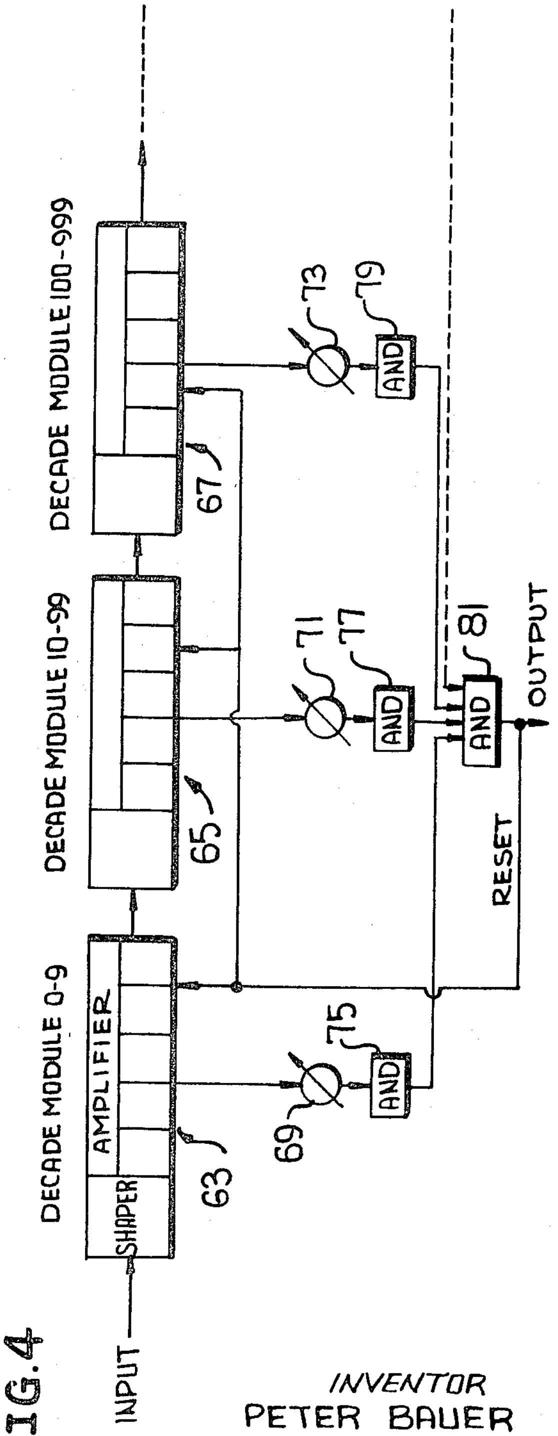
FIG. 4 is a schematic diagram of three interconnected biquinary decades of the type illustrated in FIG. 3.

Referring to FIG. 4 of the accompanying drawings, three circuits of the type illustrated in FIG. 3 are combined to form a three-decade presettable self-cycling counter 61. A units decade 63, a tens decade 65, and a hundreds decade 67 are connected to respective selector switches 69, 71 and 73 in the same manner as decade counter 43 is connected to switch 55 in FIG. 3. Likewise, switches 69, 71 and 73 are connected to respective AND-gates 75, 77 and 79 in the same manner as switch 55 is connected to AND-gate 57 in FIG. 3. The three output signals from AND-gates 75, 77, and 79 are connected as input signals to a three-input fluidic AND-gate 81 and the output signal therefrom is employed to reset all stages in counters 63, 65 and 67. In view of the description provided for the circuit of FIG. 3, it is apparent that an output pulse will be provided after every *n* pulses applied to the counters, where *n* is any number between 0 and 999, in accordance with the settings of switches 75, 77, and 79.

Figure 5:
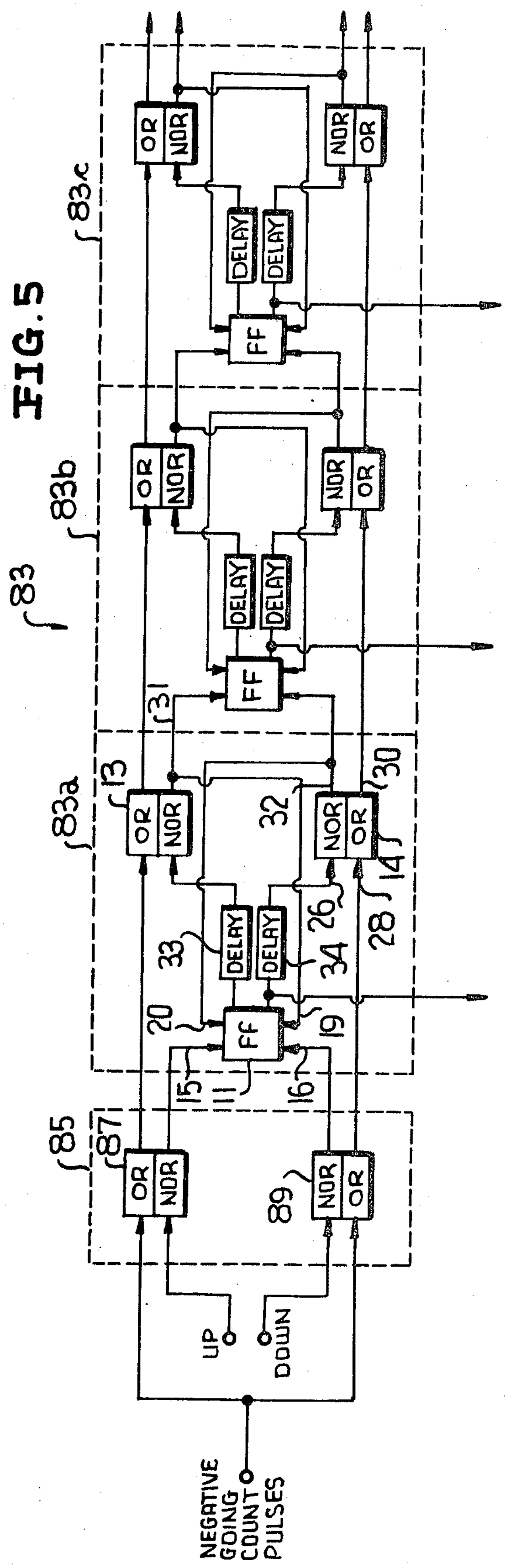
FIG. 5 is a schematic diagram of an up-down binary counter according to the principles of the present invention.

Referring now to FIG. 5 of the accompanying drawings there is illustrated an up-down counter 83 employing the principles of the present invention. The counter comprises three stages 83*a*, 83*b* and 83*c*, although more or fewer stages may be employed as desired. The individual stages are similar to the counter stage of FIG. 1, containing a flip-flop 11, delay element 33 and OR/NOR-gate 13 interconnected and functioning as described in relation to FIG. 1. In addition, up-down stages 83*a*, 83*b* and 83*c* include an additional delay element 34 and an additional OR/NOR-gate 14. Delay element 34 is connected to set output passage 21 of flip-flop 11 and has the same delay requirement as element 33, namely that the delay period through the element be greater than the width of input count pulses applied to the counter stage. The output side of delay element 34 is applied to an input passage 26 of gate 14. Another input passage 28 of gate 14 receives input pulsed pressure interruptions applied to the counter stage during a down count mode to be described in detail below. The NOR-output passage 32 of gate 14 provides down count pressure pulses to flip-flop 11 of the next counter stage and the OR-output passage 30 of gate 14 provides down count pulsed pressure interruptions to gate 14 of the next counter stage.

The stages in counter 83 are illustrated as being connected for operation in the straight or pure binary counting mode, although as described above the connections could be arranged to permit counting to other bases or in other types of binary codes. For pure binary counting, NOR-passage 31 in each stage is connected to reset input passage 19 of its own stage; likewise, NOR-passage 32 is connected to a set input passage 20 for flip-flop 11 of the same stage. Output signals from the counter are obtained from set output passages 21 of the various stages.

A count direction control circuit 85 is provided for determining the direction (up or down) in which counter 83 is to count each count pulse. Circuit 85 comprises a pair of two-input OR/NOR-gates 87 and 89. The OR output signal from gate 87 is applied to gate 13 in the first counter stage 83*a*, and the OR output signal from gate 89 is applied to gate 14 in that stage. The NOR signals from gates 87 and 89 are applied to set and reset input passages 15 and 16 respectively of flip-flop 11 in first counter stage 83*a*. One input signal applied to each of gates 87 and 89 are pulsed pressure interruptions representing pulses to be counted as might be delivered at the OR output passage of gate 41 in shaper 37 of FIG. 2. The other input signals to gates 87 and 89 are respective up and down count control signals. These latter signals are quiescently at some positive pressure and fall off to zero pressure when it is desired to actuate the indicated counting mode.

It is seen therefore that gates 87 and 89 serve to steer the input count pulsed pressure interruptions to the set or reset input ports of flip-flop 11 in stage 83*a* in accordance with which ever of the up and down count control signals is at zero pressure. The necessity for such steering can be avoided if the up and down count pulses are received on two separate lines instead of a common line as illustrated.

In operation, assume that all flip-flops are initially in their reset states, that the up count control signal is at zero pressure and that the down count control signal is at some positive pressure. Both gates 87 and 89 are in their OR modes because the input count pulse line is at a positive pressure. The first input count pulsed pressure interruption has no effect at gate 89 because of the positive pressure down count control signal; however gate 87 is switched to its NOR mode for the duration of the pulsed pressure interruption, switching flip-flop 11 in stage 83*a* to its set state. For the reasons described above, gate 13 in stage 83*a* does not change states at this time. The second count pulse is also steered through gate 87 which again goes into its NOR mode for the duration of the count pulse. The NOR signal from gate 87 has no effect on flip-flop 11 of stage 83*a* because the flip-flop is already in its set state; however, the pulsed interruption of the OR signal from gate 87 switches gate 13 in stage 83*a* to its NOR mode, providing a signal at NOR passage 31 which resets flip-flop 11 in stage 83*a*. In addition, this NOR signal switches flip-flop 11 in stage 83*b* to its set state, priming gate 13 in that stage for the next up count pulse. The counter now sits with stage 83*a* reset, stage 83*b* set, and stage 83*c* reset. If now the up count control signal assumes a positive pressure and the down count control signal assumes zero pressure, the next count pulse has no effect at gate 87 but switches gate 89 to its NOR mode. The resulting NOR pulse from gate 89 has no effect at the already reset flip-flop 11 in stage 83*a;* however the accompanying pulsed pressure interruption of the OR signal from gate 89 switches gate 14 in stage 83*a* to its NOR mode whereby the NOR pulse at passage 32 is applied to passage 20 to set the flip-flop in stage 83*a*. This NOR pulse is also applied to the reset port of flip-flop 11 in stage 83*b* and switches that flip-flop to its reset state. Examining the stage after this down count pulse we see that stage 83*a* is set and stages 83*b* and 83*c* are reset. The down count pulse has changed the binary count in counter 83 from binary 010 (equivalent to decimal 2) to binary 001 (equivalent to decimal 1). Additional up and down counting proceeds in a similar manner.

It should be appreciated, as described, that the circuit concepts disclosed herein lend themselves to counting to any desired radix or to mixed-radix counting. The principal advantages of the disclosed circuits are the economy in number of elements required per given count capacity, the inherent suitability for modular construction in the repetitive counter configurations and the reliable decimal counting scheme using a biquinary counting mode at a substantially reduced cost as compared with conventional schemes.

While I have described and illustrated specific embodiments of my invention, it will be clear that variations of the details of construction which are specifically illustrated and described may be resorted to without departing from the true spirit and scope of the invention as defined in the appended claims.

What I claim is:

1. A fluidic counter comprising a plurality of sequentially connected counter stages, each counter stage being adapted to receive time-coincident binary "1" and binary "0" input pulses, said counter stages each comprising:

bistable fluidic means having first and second stable states and responsive to said binary "1" input pulses for assuming said first stable state; and an OR/NOR gate responsive to time-coincidence of application of one of said binary "0" input pulses to said each stage and said bistable means in said first stable state for applying a fluid pulse as an input pulse to the next higher stage in said sequentially connected counter stages.

2. The fluidic counter according to claim 1 further comprising means responsive to application of said input pulses to a predetermined one of said counter stages when specified ones of said bistable means are in said first stable state for switching all of said bistable means to said second stable state.

3. The fluidic counter according to claim 1 wherein said counter comprises $n$ counter stages connected in sequence from one through $n$, and further comprising means responsive to application of said input pulses to stage $m$, where $m \leq n$, when the bistable means of stages one through $m$ are in their first stable state for switching the bistable means of stages one through $m$ to their second stable state.

4. The fluidic counter according to claim 3 wherein $n$ is equal to five and $m$ is equal to four and further comprising means responsive to application of said input pulses to the fifth stage when the bistable means of said fifth stage is in said first stable state for switching the bistable means of said fifth stage to said second stable state.

5. The counter according to claim 4 further comprising selectively settable decoder means for providing an output signal whenever the bistable means of preselected ones of said stages are in said first stable state.

6. The counter according to claim 5 further comprising means responsive to said output signal for switching the bistable means in all of said counter stages to said second stable state.

7. The counter according to claim 3 wherein $n$ is equal to two and $m$ is equal to two, the two stages comprising a single stage of a base-three counter.

8. A fluidic counter stage adapted to receive sequential count commands which comprise a fluid signal pulse on a first signal line and a pulsed signal interruption on a second signal line, said signal pulse and said pulsed signal interruption being time-coincident and having a specified maximum pulse width, said stage comprising:

a bistable fluidic element, having first and second input means and first and second output means, for providing a first signal at said first output means indicative of a first stable state in response to a fluid signal applied to said first input means and providing a second output signal at said second output means indicative of a second stable state in response to a fluid signal applied to said second input means;

a fluidic OR/NOR gate having at least two input means and OR and NOR output means for providing a fluid OR signal at said OR output means in response to a fluid signal applied to either or both said two input means and providing a fluid NOR signal at said NOR output means in response to neither of said two input means receiving a fluid signal;

fluid signal delay means for delaying fluid input signals applied thereto for a period of time which is greater than said maximum specified pulse width;

means for connecting said delay means in series between said second output means of said bistable fluidic element and one of said two input means of said fluidic OR/NOR gate;

means for connecting said first signal line to said first input means of said bistable fluidic element; and means for connecting said second signal line to said other of said two input means of said fluidic OR/NOR gate.

9. The fluidic counter stage according to claim 8 further comprising fluid passage means for connecting said NOR output means to the second input means of said bistable fluidic element.

10. A fluidic counter comprising $n$ counter stages, each counter stage having a bistable fluidic element, a fluidic OR/NOR gate and fluid signal delay means provided and interconnected according to claim 8, said stages being arranged in a sequence from stages one through $n$ inclusive, said counter further comprising:

fluid passage means for connecting the OR output means of stages one through $n$-1 to said other of said two input means of the fluidic OR/NOR gates in stages two through $n$ respectively; and fluid passage means for connecting the NOR output means of stages one through $n$-1 to said first input means of said bistable fluidic elements in stages two through $n$ respectively.

11. The counter according to claim 10 further comprising reset means responsive to a NOR signal from a specified one of said counter stages for applying a fluid signal to the second input means of said bistable fluidic element in predetermined ones of said counter stages.

12. The counter according to claim 10 further comprising reset means responsive to a NOR signal from a specified one of said counter stages for applying a fluid signal to the second input means of said bistable fluidic element in said specified one of said counter stages and in all counter stages preceding said specified one in said sequence.

13. The counter according to claim 1 wherein $n$ is equal to five and further comprising:

first reset means responsive to a NOR signal from stage four for applying a fluid signal to said second input means of said bistable fluidic element in counter stages one through four inclusive; and second reset means responsive to a NOR signal from stage five for applying a fluid signal to said second input means of said bistable fluidic element in counter stage five.

14. The counter according to claim 13 further comprising presettable decoder means for providing an output signal whenever the bistable fluidic elements of preselected ones of said stages are in said first stable state.

15. The counter according to claim 14 wherein said presettable decoder means comprises:

selective actuable multiposition switch means connected to the first output means of all five of said counter stages for providing two uniquely time-coincident fluid signals at each switch position; and gating means responsive to said two uniquely time-coincident fluid signals at each switch position for providing said output signal from said decoder means 16. The counter according to claim 15 further comprising means responsive to said output signal from said decoder means for applying a fluid signal to the second input means of said bistable fluidic element in all five counter stages.

17 In an up/down fluidic binary counter, a fluidic counter stage adapted to receive a first set of sequential count commands each of which comprises a first fluid signal pulse on a first signal line and a first pulsed signal interruption on a second signal line, and a second set of sequential count commands each of which comprises a second fluid signal pulse on a third signal line and a second pulsed signal interruption on a fourth signal line, said first signal pulse being time-coincident with said first pulsed signal interruption, said second signal pulse being time-coincident with said second pulsed signal interruption, and said first and said signal pulses and first and second pulsed signal interruptions having a specified maximum pulse width, said stage comprising:

a bistable fluidic element, having first and second input means and first and second output means, for providing a first signal at said first output means indicative of a first stable state in response to a fluid signal applied to said first input means and providing a second output signal at said second output means indicative of a second stable state in response to a fluid signal applied to said second input means;

first and second fluidic OR/NOR gates each having at least two input means and OR and NOR output means for providing a fluid OR signal at said OR output means in response to a fluid signal applied to either or both said two input means and providing a fluid NOR signal at said NOR output means in response to neither of said two input means receiving a fluid signal;

first and second fluid signal delay means, each for delaying fluid input signals applied thereto for a period of time which is greater than said maximum specified pulse width;

means for connecting said first delay means in series between said second output means of said bistable fluidic element and one of said two input means of said first fluidic OR/NOR gate;

means for connecting said second delay means in series between said first output means of said bistable fluidic element and one of said two input means of said second fluidic OR/NOR gate;

means for connecting said first signal line to said first input means of said bistable fluidic element;

means for connecting said second signal line to the other of said two input means of said first fluidic OR/NOR gate;

means for connecting said third signal line to said second input means of said bistable fluidic element; and means for connecting said fourth signal line to the other of said two input means of said second fluidic OR/NOR gate.

* * * * *